United States Patent [19]
Williams

[11] 4,080,084
[45] Mar. 21, 1978

[54] SPLICING DEVICE FOR OVERLAPPED RODS

[76] Inventor: Chester I. Williams, Grand Rapids, Mich.

[21] Appl. No.: 761,464

[22] Filed: Jan. 21, 1977

[51] Int. Cl.² ............................................. F16B 2/02
[52] U.S. Cl. ..................................... 403/393; 403/399
[58] Field of Search ............... 403/398, 393, 386, 390, 403/396, 341, 399, 387

[56] References Cited

U.S. PATENT DOCUMENTS

| 1,260,566 | 3/1918 | Mathias | 403/393 |
| 1,260,567 | 3/1918 | Mathias | 403/393 |
| 2,826,134 | 3/1958 | Wilson | 403/390 X |
| 3,058,185 | 10/1962 | Clayton et al. | 403/393 X |
| 3,440,694 | 4/1969 | Durbin | 403/399 |
| 3,771,884 | 11/1973 | Williams | 403/393 X |

Primary Examiner—Andrew V. Kundrat

[57] ABSTRACT

A U-shaped plate has locating notches in the ends of the legs providing surfaces that are received between the ridges forming the standard configuration of a concrete reinforcing bar. The plate is clamped against either a pair of rods to hold them in interengagement, or against one rod to secure an additional rod attached to the legs of the plate in parallelism to the clamped rod.

6 Claims, 6 Drawing Figures

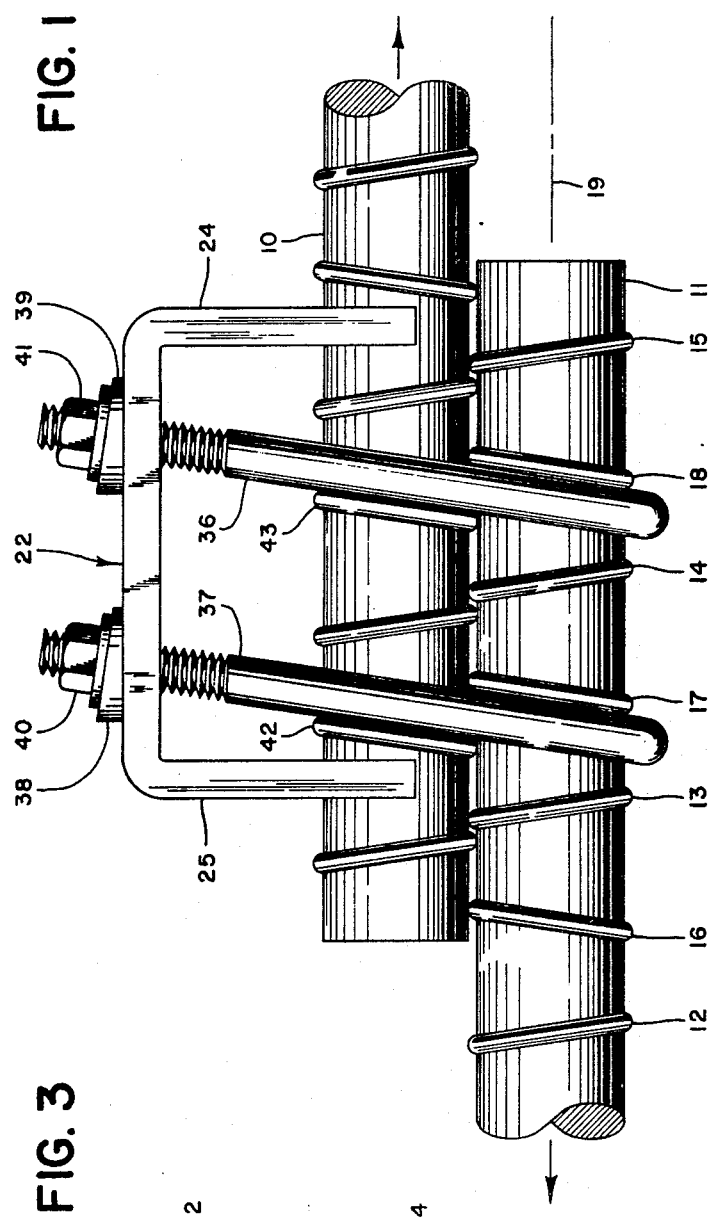
FIG. 1
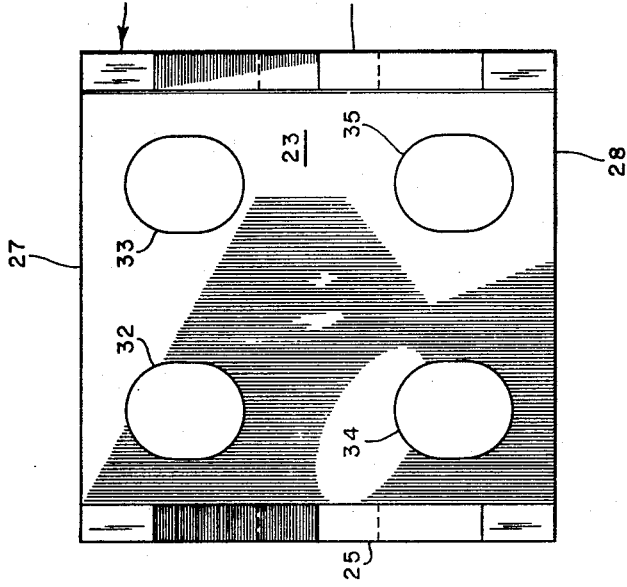
FIG. 3
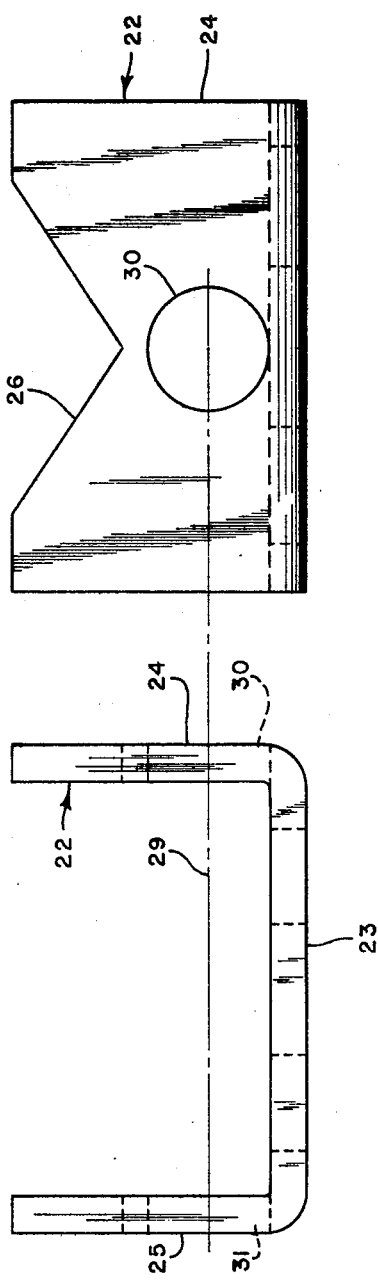
FIG. 4
FIG. 5

SPLICING DEVICE FOR OVERLAPPED RODS

BACKGROUND OF THE INVENTION

It has been common practice to secure rods in overlapped relationship by applying a clamping device functioning primarily to generate a substantial force holding the rods together in bearing engagement. The clamping forces are commonly generated by U-bolts embracing the rods, and traversing a plate forming a platform against which the U-bolts can be tightened. Reinforcing bars used in concrete structures have been secured by various forms of such clamping devices, which must be adapted to accommodate the standard ridged configuration on the surface of these rods. These ridges are formed in planes inclined to the axis of the rod, and commonly occur in planes of alternating inclination. Clamping devices for engaging such rods will preferably provide a corresponding inclination to the U-bolts, in arrangements such as those appearing in U.S. Pat. No. 3,771,884, issued to the present inventor. Since the stresses in such rods commonly approach the yield point of the rod material, it is desirable to utilize to as great a degree as possible the ridges on the rods as points for transfering the stresses. Prior devices, some of which have superficial appearances of similarity to the present invention, have not accomplished this utilization of the ridge configuration to the degree that has been found possible. Rods may be secured in overlapping relationship in situations where (a) both rods are concrete-reinforcing bars, and (b) one of the rods is a reinforcing bar, and the other rod secured to it has a smooth peripheral surface.

SUMMARY OF THE INVENTION

A clamping device adapted to accommodate either a pair of standard concrete reinforcing bars in overlapped relationship, or one reinforcing bar in conjunction with a rod having a smooth periphery, and spaced from the reinforcing bar in overlapping parallelism with it. The splicing device centers in a U-shaped plate, the legs of which have aligned notches, respectively, disposed to receive the reinforcing bar in bearing contact at positions between the ridges. Apertures are provided in the back of the U-shaped plate for receiving a pair, preferably, of U-bolts, and aligned apertures are provided in the legs of the U-shaped plate for alternatively receiving a second rod secured by nuts in threaded engagement with the rod on opposite sides of the U-shaped plate. The spacing relationship of the U-bolts is such that the bolts are interposed between the slanted ridges of both concrete reinforcing bars, when the device is used to secure such bars together. The limited resilience of the U-shaped plate permits the interengagement of the legs with the reinforcing bar ridges to yield slightly so that the interengagement forces are additive to those due to the interengagement of the ridges themselves on the bars, rather than providing sequential engagement which adds nothing to the total strength of the splice.

DESCRIPTION OF THE DRAWING

FIG. 1 is a side elevation showing a pair of concrete reinforcing bars secured together in overlapping relationship by the splicing device.

FIG. 3 is a plan view of the U-shaped splicing plate.

FIG. 4 is a side elevation of the U-shaped splicing plate.

FIG. 5 is an end elevation of the splicing plate.

DESCRIPTION OF THE PREFERRED EMBODIMENT

Referring to FIG. 1, the concrete reinforcing bars 10 and 11 are identical, and are of standard configuration. Each of these bars has a series of ridges as indicated at 12-15 on bar 11, and a second series of ridges 16-18 interposed between the ridges of the former series. Each of these series has a characteristic inclination to the axis 19 of the rod 11. The ridges are provided for increased interengagement with the surrounding concrete in which these rods are normally embedded. It is often necessary to splice these rods together, either at positions within or outside of the poured concrete.

Figure 6:
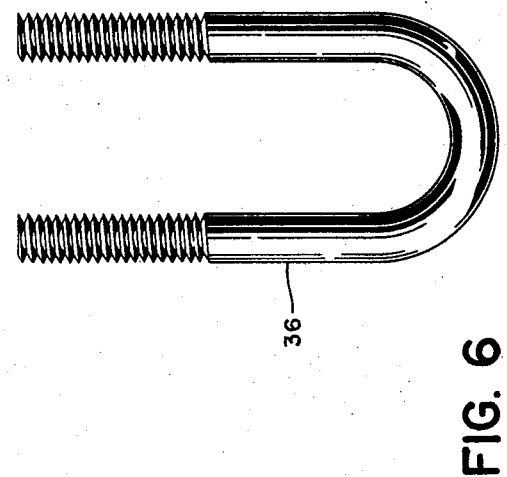
FIG. 6 is a plan view showing a U-bolt of the type used in conjunction with the FIG. 1 and FIG. 2 assemblies.
Figure 2:
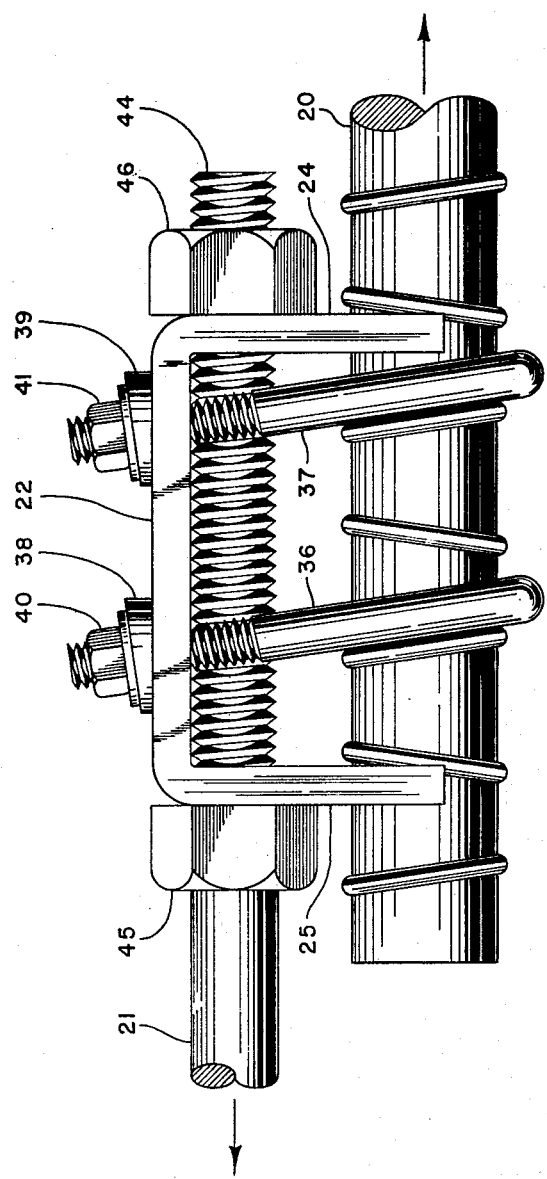
FIG. 2 illustrates a splice connecting a concrete reinforcing bar to another bar of smooth peripheral configuration.

FIG. 2 illustrates a similar splicing situation, but involving the attachment of a reinforcing bar 20 to another rod 21, the latter having a smooth periphery. It is obviously impossible in such cases to provide for the type of interengagement of the ridges for stress transfer as that which is illustrated in FIG. 1. In both splicing situations, the splicing device centers in the U-shaped plate 22 shown in detail in FIGS. 3, 4, and 5. This plate has a flat back 23 and the spaced parallel legs 24 and 25. Both of these legs have notches as shown at 26 in FIG. 5, and these are aligned so that the plane of symmetry of the notches is generally parallel to the edges 27 and 28 of the plate, and to the alignment axis 29 of the apertures 30 and 31 in the opposite legs of the plate. Pairs of elongated holes 32-33 and 34-35 are provided in the back 23 for receiving the legs of the U-bolts 36 and 37, which are preferably identical. The incline of these U-bolts is accommodated by bevel washers as indicated at 38 and 39. Nuts as shown at 40 and 41 are in threaded engagement with the ends of the U-bolts to generate the necessary clamping effect.

The spacing of the U-bolts 36 and 37 is selected so that they may be received between the ridges of the rods 10 and 11 in the FIG. 1 configuration, and between those of the rod 20 in the FIG. 2 configuration. In FIG. 1, this spacing also provides for the bolts 36 and 37 to be interposed between the ridges 17 and 18 on the rod 11 and correspondingly inclined ridges 42 and 43 of the rod 10. This form of interengagement is additional to the obvious interengagement of the ridges on the rods 10 and 11 which are adjacent to each other. The spacing between the legs of the U-bolts provides for a close reception of the rods, so that the interposition of the bolts between the ridges, as described above, can provide an effective transfer of forces. The resilience of the U-bolts, coupled with the resilience of the U-shaped plate 22, provides a sufficient degree of yield so that the application of excessive tension in the direction of the arrows in FIG. 1 will allow enough shift for the interengagement of the U-bolts to be an additive factor to that of the interengagement of the ridges themselves. If these interengagements were all similarly positive, one would inherently become stressed before the other, and the two systems would then strip out in sequence. The total strength of the splice would then be that of the strongest system of interengagement. With the slight yielding action provided by the assembly shown in FIG. 1, however, the two effects can become additive.

In the FIG. 2 arrangement, the rod 21 is threaded from the end 44 to a distance sufficient to accommodate the nut 45. With the nut 45 in position, the rod 21 is inserted through the apertures 30 and 31, and the nut 46 then tightened down to the illustrated position. The rod 21 passes between the legs of the U-bolts 36 and 27, and a solid pattern of stress transfer takes place at the ridges of the rod 20 where they interengage the legs 24 and 25 of the U-shaped plate 22, and also where the ridges engage the U-bolts 36 and 37. Here, again, the slight resilience of the clamping device permits these two effects to be additive, rather than merely sequential.

I claim:

1. In combination with at least one rod having regularly spaced ridges in planes inclined to the axis of said rod, a splicing device for securing an additional rod to said one rod in overlapping relationship, said device including U-bolt means gripping said one rod between and in engagement with one of said ridges, wherein the improvement comprises:
  a U-shaped plate member having a back and spaced legs at the opposite extremities of said back, respectively, said back having at least one aperture normally receiving said U-bolt means, and said legs having aligned tapered notches in the ends thereof, respectively, said legs being disposed to be received between said ridges at points of contact between said notches and said one rod and said legs being spaced apart sufficiently to allow said U-bolt means to accommodate the inclination and spacing of said ridges that lie between the planes of said legs.

2. A device as defined in combination in claim 1, wherein said legs have aligned apertures, respectively, on an axis parallel to the alignment axis of said notches.

3. A device as defined in combination in claim 1, wherein said additional rod is incorporated in said combination, and is provided with the ridge configuration of said one rod, and wherein said U-bolt means includes at least two U-bolts disposed in planes parallel to said ridges, and interposed in bearing contact between ridges on said one rod and additional rod, respectively.

4. In combination with at least one rod having regularly spaced ridges in planes inclined to the axis of said rod, a splicing device for securing an additional rod to said one rod in overlapping relationship, said device including U-bolt means adapted to grip said one rod between said ridges, wherein the improvement comprises: a U-shaped plate member having a back and spaced legs at the opposite extremities of said back, respectively, said back having at least one aperture normally receiving said U-bolt means, and said legs having aligned notches in the ends thereof, respectively, said legs being disposed to be received between said ridges at points of contact between said notches and said one rod, said legs additionally having aligned apertures, respectively, on an axis parallel to the alignment axis of said notches.

5. A device as defined in combination in claim 4, wherein said aperture axis is disposed between the legs of said U-bolt means.

6. A device as defined in combination in claim 5, wherein said notches are V-shaped, and the axis of said apertures is disposed on the plane of symmetry of said notches.

* * * * *